(12) United States Patent
Rosenberger et al.

(10) Patent No.: US 12,378,150 B2
(45) Date of Patent: *Aug. 5, 2025

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Ralph Sattmann, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 511 days.

This patent is subject to a terminal disclaimer.

(21) Appl. No.: 17/617,220

(22) PCT Filed: Jul. 15, 2020

(86) PCT No.: PCT/EP2020/069973
§ 371 (c)(1),
(2) Date: Dec. 7, 2021

(87) PCT Pub. No.: WO2021/009208
PCT Pub. Date: Jan. 21, 2021

(65) Prior Publication Data
US 2022/0227658 A1    Jul. 21, 2022

(30) Foreign Application Priority Data

Jul. 17, 2019 (EP) .................... 19186735

(51) Int. Cl.
*C03B 37/012* (2006.01)
*C03B 37/027* (2006.01)
*G02B 6/02* (2006.01)

(52) U.S. Cl.
CPC .... *C03B 37/02781* (2013.01); *C03B 37/0122* (2013.01); *C03B 37/01234* (2013.01);
(Continued)

(58) Field of Classification Search
CPC ............. C03B 37/012; C03B 2203/14; C03B 2203/16; C03B 2203/42; C03B 37/0122; C03B 37/01234; G02B 6/02328
See application file for complete search history.

(56) References Cited

U.S. PATENT DOCUMENTS 6,529,653 B1    3/2003   Miller
7,155,097 B2 *  12/2006  Jakobsen ............. G02B 6/2551
                                                          385/127

(Continued)

FOREIGN PATENT DOCUMENTS

CN    105807363 A      7/2016
DE    102004054392 A1  3/2006
(Continued)

OTHER PUBLICATIONS

Edavalath, "Design and fabrication of effectively single mode hollow-core single-ring photonic crystal fibres", Oct. 8, 2018, Max Planck Institute for Science of Light, Doctoral thesis of Nitin N. Edavalath (Year: 2018).*

(Continued)

*Primary Examiner* — Erin Snelting
*Assistant Examiner* — Steven S Lee
(74) *Attorney, Agent, or Firm* — Panitch Schwarze Belisario & Nadel LLP (57) ABSTRACT

A high degree of precision and an exact positioning of anti-resonant elements in a sufficiently stable and reproducible manner is achieved in that a step of providing a cladding tube includes a processing measure, in which the cladding tube wall is machined with a longitudinal structure extend- (Continued)

ing in the direction of the cladding tube longitudinal axis in the region of the target positions.

11 Claims, 2 Drawing Sheets

(52) U.S. Cl.
CPC ...... *C03B 37/0124* (2013.01); *G02B 6/02328* (2013.01); *C03B 2203/16* (2013.01); *C03B 2203/42* (2013.01)

(56) References Cited

U.S. PATENT DOCUMENTS

| | | | | |
|---|---|---|---|---|
| 7,343,074 | B1 * | 3/2008 | Gallagher | G01N 21/3504 385/12 |
| 7,677,059 | B2 * | 3/2010 | Mori | C03B 37/01211 65/393 |
| 7,715,672 | B2 * | 5/2010 | Dong | G02B 6/02261 385/109 |
| 7,792,394 | B2 * | 9/2010 | Dong | G02B 6/02238 385/127 |
| 11,668,871 | B2 * | 6/2023 | Poletti | C03B 37/01211 385/125 |
| 2003/0172682 | A1 | 9/2003 | Sato et al. | |
| 2003/0230118 | A1 | 12/2003 | Dawes et al. | |
| 2004/0096173 | A1 | 5/2004 | Fekety et al. | |
| 2005/0147366 | A1 * | 7/2005 | Large | C03B 37/0122 385/123 |
| 2005/0226578 | A1 | 10/2005 | Mangan et al. | |
| 2006/0046075 | A1 | 3/2006 | Maul et al. | |
| 2006/0130528 | A1 | 6/2006 | Nelson et al. | |
| 2008/0310806 | A1 | 12/2008 | Mukasa | |
| 2009/0019893 | A1 | 1/2009 | Bogdahn | |
| 2009/0320526 | A1 * | 12/2009 | Carberry | G01N 21/31 65/385 |
| 2013/0008210 | A1 * | 1/2013 | Chamorovskiy | C03B 37/02781 65/412 |
| 2018/0267235 | A1 * | 9/2018 | Russell | C03B 37/02781 |

FOREIGN PATENT DOCUMENTS

| | | | | |
|---|---|---|---|---|
| DE | 102005028219 | B3 | 10/2006 | |
| DE | 102014011041 | A1 | 1/2016 | |
| EP | 2322489 | A1 * | 5/2011 | ....... C03B 37/01217 |
| EP | 3136143 | A1 | 3/2017 | |
| GB | 2566466 | A | 3/2019 | |
| JP | 2000137143 | A | 5/2000 | |
| JP | 2018150184 | A * | 9/2018 | |
| WO | 02/072489 | A2 | 9/2002 | |
| WO | 2009010317 | A1 | 1/2009 | |
| WO | 2018067445 | A2 | 4/2018 | |
| WO | 2018/169487 | A1 | 9/2018 | |
| WO | WO-2019008352 | A1 * | 1/2019 | ........... C03B 23/207 |
| WO | WO-2019053412 | A1 * | 3/2019 | ....... C03B 37/01208 |
| WO | WO-2019228596 | A1 * | 12/2019 | ....... C03B 37/01222 |

OTHER PUBLICATIONS

Nawazuddin, "Lotus-Shaped Negative Curvature Hollow Core Fiber With 10.5 dB/km at 1550 nm Wavelength", Mar. 1, 2018, Journal of Lightwave Technology, vol. 36, No. 5, 1213-1219 (Year: 2019).*
叶朗,, The First Office Action for Application No. or Pubilcation No. 202080034652.0, The State Intellectual Property Office of People's Republic of China, published Mar. 15, 2023 (Year: 2023).*
Nagata, Notice of Reasons for Refusal for Application number: Japanese Patent Application No. 2021-570389, published Mar. 5, 2024 (Year: 2024).*
International Search Report and Written Opinion mailed Sep. 14, 2020 by the European Patent Office in its capacity as International Searching Authority for counterpart international patent application No. PCT/EP2020/069973 (with English translations attached).
Poletti, Francesco "Nested antiresonant nodeless hollow core fiber," Optics Express, vol. 22, No. 20 (2014) pp. 23807-23828 (DOI:10.1364/OE.22.023807).
Yu, Fei, "Chapter 4—Fabrication of hollow core negative curvature fibre" IN "Hollow core negative curvature fibres" University of Bath PhD. pp. 59-74, Dec. 31, 2013 (XP055656461).
Kosolapov, A.F. et al, "Hollow-core revolver fibre with a double-capillary reflective cladding" Quantum Electronics 46 (3) Mar. 29, 2016 pp. 267-270 (DOI: 10.1070/QEL15972).
Jasion, Gregory T. et al, "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).
Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).
Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).
Office Action issued Mar. 16, 2023 in Chinese Patent Application No. 202080034652.0 (with English Summary).

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:
- (a) providing a cladding tube comprising an inner bore of the cladding tube and a longitudinal axis of the cladding tube along which a cladding tube wall delimited by an inner side and an outer side extends,
- (b) providing a number of anti-resonance element preforms,
- (c) arranging the anti-resonance element preforms at desired positions on the inner side of the cladding tube wall to form a primary preform for the hollow-core fiber which comprises a hollow core region and a sheath region, and
- (d) elongating the primary preform to form the hollow-core fiber or further processing the primary preform into a secondary preform from which the hollow-core fiber is drawn, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation.

The invention also relates to a method for producing a preform for an anti-resonant hollow-core fiber comprising a hollow core extending along a longitudinal axis of the fiber and the sheath region surrounding the hollow core, which sheath region comprises a plurality of anti-resonance elements, comprising the method steps of:
- (a) providing a cladding tube comprising an inner bore of the cladding tube and a longitudinal axis of the cladding tube along which a cladding tube wall delimited by an inner side and an outer side extends,
- (b) providing a number of anti-resonance element preforms,
- (c) arranging the anti-resonance element preforms at desired positions on the inner side of the cladding tube wall to form a primary preform for the hollow core fiber which comprises a hollow core region and a sheath region, and
- (d) optionally further processing the primary preform into a secondary preform for the hollow-core fiber, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation Conventional single-mode optical fibers made of solid material have a core region made of glass, which is surrounded by a sheath region made of glass with a lower refractive index. Light guidance is based thereby on total reflection between the core and the cladding region. However, the interactions of the guided light with the solid material are associated with an increased latency in data transmission and relatively low damage thresholds with respect to high-energy radiation. These disadvantages are prevented or reduced by "hollow-core fibers" in which the core comprises an evacuated cavity filled with gas or liquid. In hollow-core fibers, the interaction of the light with the glass is less than in solid core fibers. The refractive index of the core is less than that of the sheath so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission. Potential applications of the hollow-core fibers lie in the fields of data transmission, high-power beam guidance, for example for material processing, modal filtering, non-linear optics, in particular for super-continuum generation, from the ultraviolet to infrared wavelength range.

PRIOR ART

A disadvantage of anti-resonant hollow-core fibers is that higher-order modes are not necessarily suppressed so that they are often not exclusively single-mode over long transmission distances and the quality of the output beam deteriorates.

In the paper by Francesco Poletti "Nested anti-resonant nodeless hollow core fiber," Optics Express, vol. 22, no. 20 (2014), DOI: 10.1364/OE 22.023807, a fiber design is proposed in which anti-resonance elements are not designed as a simple singular structural element but are composed of several nested structural elements. The nested anti-resonance elements are designed such that higher-order core modes are phase-matched to the sheath modes and are suppressed, but not the fundamental core mode. As a result, the propagation of the fundamental core mode is always ensured, and the hollow-core fiber can be effectively single-mode over a limited wavelength range. Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), in which the core can conduct further modes in addition to the fundamental mode. For this purpose, it is surrounded by an inner sheath having "non-resonant elements" which provide a phase-matching of anti-resonant modes with the higher modes. The hollow-core fiber is produced according to what is known as a "stack-and-draw technique" by arranging the starting elements to form an axially parallel ensemble and fastening them to form a preform and then elongating the preform. In this case, a cladding tube with a hexagonal inner cross-section is used, and six so-called "ARE preforms" (anti-resonance element preforms) are fastened in the inner edges of the cladding tube. This preform is drawn in two stages to form a hollow-core fiber.

WO 2018/169487 A1 discloses a method for producing a preform for anti-resonant hollow-core fibers in which a first sheath region comprises a plurality of rods and a second sheath region comprises a plurality of tubes surrounded by an outer cladding tube. Rods, tubes, and cladding tube are joined to form a preform by means of the "stack and draw" technique. Before the preform is elongated, the preform end is sealed which is done by applying a sealing compound. For example, a UV adhesive is used as the sealing compound.

TECHNICAL OBJECT

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber drawing process. In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance element inner tube welded on one side to the inner sheath surface of the ARE outer tube (ARE inner tube, for short) must be attached to the inner side of a cladding tube. In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow-core fiber, this object is achieved according to the invention on the basis of a method of the aforementioned genus in that the provision of the cladding tube according to method step (a) comprises a machining measure in which by machining in the region of the desired positions, the cladding tube wall is provided with a longitudinal structure extending in the direction of the longitudinal axis of the cladding tube. The starting point for producing the anti-resonant hollow-core fiber is a preform referred to herein as a "primary preform." It comprises a cladding tube in which or on which precursors or preforms for the shaping of anti-resonance elements are contained in the hollow-core fibers (referred to here as "anti-resonance elements" for short). The primary preform can be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform are surrounded by a buffer tube or a plurality of buffer tubes to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The accuracy of the positioning of the preforms is improved by structuring the cladding tube beforehand by mechanical machining.

Machining is understood to mean mechanical machining techniques that remove material, such as turning, separating, drilling, sawing, milling, or grinding. In comparison to other known forming techniques, said machining techniques provide more precise and finer structures by using heat and pressure and avoid contamination of surfaces by molding tools, such as nozzles, presses or fusion molds. The longitudinal structure of the cladding tube wall is preferably produced by drilling, sawing, milling, cutting or grinding.

This machining creates a longitudinal structure extending in the direction of the longitudinal axis of the cladding tube and serves as a positioning aid for the anti-resonance element preforms. It makes it easier for the anti-resonance element preforms to assume predetermined defined positions on the inner side of the cladding tube. For this purpose, the longitudinal structure is accessible at least from the inner side of the cladding tube; it may also extend through the entire cladding tube wall to the outer side.

With the invention, anti-resonant hollow-core fibers and preforms for this purpose can be produced precisely and reproducibly.

A cladding tube with a circular inner cross-section is preferably provided, wherein the longitudinal structure is designed as a longitudinal groove on the inner side of the cladding tube wall or as a longitudinal slot.

Due to the fact that a cladding tube with a round inner cross-section is provided for the purpose of structuring the inner side of the cladding tube, little manufacturing effort is required for the cladding tube itself, for example, in comparison to a cladding tube having an inner bore in the form of an internal hexagon.

The positioning points may have different shapes. Longitudinal structures, which are designed as a longitudinal groove on the inner side of the cladding tube wall or as longitudinal slots that are continuous in the radial direction, can be manufactured easily and precisely; for example, by milling, drilling or cutting in. The inner geometry of the groove and slot is, for example, semicircular, semi-oval, V-shaped, U-shaped or polygonal. It may also form a depression or recess which narrows from the inside to the outside.

Particularly in the case of continuous longitudinal slots, it is advantageous for the cladding tube to have end-face ends, wherein the longitudinal structure ends before the end-face ends. Depending on the geometry of the longitudinal structure and the shape and size of the anti-resonance element preforms, a contact point, multiple contact points or larger contact surfaces result between the anti-resonance element preform and the longitudinal structure during fixing. A method in which the anti-resonance element preforms touch the longitudinal structure at two edges in each case when arranged at the desired position according to method step (c), has proven to be particularly successful.

This results in a more stable position than with only one contact line and can reliably prevent the anti-resonance element preform from "rolling away" during elongation. The outer dimension (for example, the external diameter) of the preform may be greater than the maximum width $S_B$ of the longitudinal structure so that the preform rests on the longitudinal groove or the longitudinal slot and is not completely immersed therein. Below the support edges, a cavity optionally results in the longitudinal groove or in the longitudinal slot, into which cavity a gas can be introduced or from which cavity a gas can be drawn off.

In another preferred method, the anti-resonance element preforms have an external diameter that is smaller than the maximum width $S_B$ of the longitudinal structure. Here, for example, the grooves may be so shallow that they only predetermine a preferred position for the anti-resonance element preforms.

In a further preferred method, the anti-resonance element preforms likewise have an external diameter that is smaller than the maximum width $S_B$ of the longitudinal structure; however, the anti-resonance element preforms are at least partially enclosed by the longitudinal structure and are thereby completely fastened in the cladding tube wall.

In a particularly advantageous embodiment of this method, an insert tube is additionally inserted into the inner bore of the cladding tube, wherein the anti-resonance element preforms are each enclosed in a pressure space between the longitudinal structure and the insert tube.

In this way, on each of the longitudinal structures of the preform, a hollow channel is formed in which an anti-resonance element preform is accommodated, and which is delimited by walls of the longitudinal structure and of the insert tube.

During the performance of a process according to method step (d), such as during elongation or collapse, gas is introduced into the hollow channel and the insert tube is thereby deformed by applying an internal pressure in the pressure space. In this case, the wall sections of the insert tube abutting against the longitudinal structure (more precisely: against the pressure space) deform and form elongated bulges, projecting inwardly toward the hollow core, on the inner side of the insert tube, said bulges serving as anti-resonance elements.

A method variant has proven itself in which the anti-resonance element preforms each have at least one anti-resonance element and at least one capillary connected to the anti-resonance element, wherein the capillary is accommodated in a recess of the longitudinal structure and, when the preform and/or the semi-finished product is elongated, is deformed by applying an internal pressure in the inner bore of the capillary.

On the one hand, the capillary serves to fix the anti-resonance element preform to the longitudinal structure, which for this purpose has a recess with dimensions sufficient to accommodate the capillary, and on the other hand, during the elongation process, the capillary is additionally pressurized so that it positions the actual anti-resonance element of the preform as a result of its deformation and expansion. The wall of the reshaped capillary can form an additional anti-resonance element of the preform.

In a preferred method variant, the longitudinal structure has longitudinal slots distributed around the circumference of the cladding tube wall, wherein the anti-resonance element preforms are arranged on a longitudinal slot.

The longitudinal slots penetrate the cladding tube wall from the inside to the outside, with the exception of the two end-face end regions of the cladding tube. They have parallel longitudinal edges and a maximum slot width $S_B$, wherein the anti-resonance element preforms are preferably connected to the longitudinal edges.

The width dimension of the anti-resonance element preforms is greater than the maximum width $S_B$ so that they are not completely immersed in the longitudinal slots.

In order to ensure a more precise geometric structure, the production of the connection between the anti-resonance element preform and the respective longitudinal edges is by softening and is simultaneously accompanied by a lengthening of the connection. For this purpose, the ensemble consisting of cladding tube and anti-resonance element preforms is elongated. The anti-resonance element preforms are thereby connected over their entire length to the cut edges inside the cladding tube.

The region below the longitudinal edges forms a cavity into which a gas can be introduced or from which a gas can be drawn off.

In particular with regard to a low optical attenuation and a large optical transmission bandwidth of the hollow-core fiber, it has proven to be particularly advantageous for the anti-resonance element preforms to be arranged around the hollow core with an odd-numbered symmetry.

In a preferred method variant, the arrangement of the anti-resonance element preforms and/or the elongation of the primary preform and/or the drawing of the hollow-core fiber comprises a fastening measure and/or a sealing measure using a sealing or bonding compound containing amorphous $SiO_2$ particles.

The sealing or bonding compound used for sealing or fastening contains amorphous $SiO_2$ particles, which are held, for example, in a dispersion liquid. This compound is applied between the surfaces to be bonded or sealed and is generally pasty during use. When dried at low temperature, the dispersion liquid is partially or completely removed and the compound solidified. The sealing or bonding compound, and, in particular, the solidified $SiO_2$-containing sealing or bonding compound obtained after drying, satisfies the requirements for fastening and compacting. The temperature required for drying is below 300° C., which facilitates compliance with the dimensional stability of the preform and avoids thermal impairments. Heating to higher temperatures around 800° C., for example during elongation of the preform to form the hollow-core fiber, results in further thermal solidification of the sealing or bonding compound, which is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be completely compacted by heating and vitrified by heating in the hot-forming process.

In the hot-forming process, the sealing or bonding compound does not decompose and releases few impurities. It is thus characterized by thermal stability and purity in the hot-forming process and avoids deformations resulting from different thermal coefficients of expansion.

The sealing and bonding compound may also advantageously be used to seal open ends of the anti-resonance element preforms and/or individual structural elements of the anti-resonance element preforms and/or any annular gap between tube elements when the primary preform is being elongated and/or when the hollow-core fiber is being drawn.

In this way, the individual components of the primary preform and/or secondary preform may be subjected to different internal pressures during elongation or during the fiber-drawing process. In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube is provided with an external diameter in the range of 90 and 250 mm, and preferably with an external diameter in the range of 120 to 200 mm. These components each have a length of at least 1 m. They are relatively high-volume structural elements for forming anti-resonance elements. This simplifies handling. In addition, with a vertical arrangement of cladding tube and structural elements, gravitational force supports the parallelity and vertical alignment of the longitudinal axes of the structural elements when the structural elements are each positioned and fastened at their upper end-face end in the desired position, for example and preferably using the sealing or bonding compound explained in more detail above.

With regard to the production of the preform for the hollow-core fiber, the aforementioned technical object is achieved according to the invention on the basis of a method of the aforementioned genus in that the provision of the cladding tube according to method step (a) comprises a machining measure in which by machining in the region of the desired position, the cladding tube wall is provided with a longitudinal structure extending in the direction of the longitudinal axis of the cladding tube.

The preform is a starting point for the production of the anti-resonant hollow-core fiber. By elongating the primary preform, either the anti-resonant hollow-core fiber is drawn directly, or a different semi-finished product is first produced by further processing of the primary preform, which semi-finished product is also referred to herein as the "secondary preform," and from which semi-finished product the anti-resonant hollow-core fiber can be drawn.

In any case, the production of the preform comprises the installation and the connecting of anti-resonance element preforms to a cladding tube. The accuracy of the positioning of the preforms is improved by structuring the cladding tube beforehand. Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls which, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material, or crystalline material.

Anti-Resonance Element Preform/Anti-Resonance Element Precursor

What are referred to as anti-resonance element preforms are components or constituents of the preform that essentially become anti-resonance elements in the hollow-core fiber by simple lengthening during the fiber-drawing process. Components or constituents of the preform that are first formed into anti-resonance element preforms or directly into anti-resonance elements by forming are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element may be a further tube which bears against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multiple nested anti-resonance element preforms, at least one further structural element, for example a third tube abutting against the inner sheath surface of the nested ARE inner tube, may be arranged in the inner bore of the nested ARE inner tube. Where there are multiple nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour). Further processing of the primary preform, in particular by hot-forming steps, can result in intermediate products in which the original anti-resonance element preforms are present in a shape that has been modified compared to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform may be present as an ensemble consisting of at least one cladding tube and preforms or precursors for anti-resonance elements that are loosely accommodated or firmly fixed therein. The further processing of the primary preform into a secondary preform from which the hollow-core fiber is drawn may comprise a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" which has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube" and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling and grinding. This machining creates a longitudinal structure extending in the direction of the longitudinal axis of the cladding tube and serves as a positioning aid for the anti-resonance element preforms. The longitudinal structure is accessible from the inner side of the cladding tube; it may also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

EXEMPLARY EMBODIMENT

The invention is explained in more detail below with reference to an exemplary embodiment and a drawing. The following are shown in detail in schematic representation.

In the production of the hollow-core fiber or the preform for the hollow-core fiber, a plurality of components are to be connected together. In addition, it can be helpful to seal existing gaps or channels of the preform when carrying out hot-forming processes. For bonding or sealing, a sealing or bonding compound based on $SiO_2$ is used, as is known from DE 10 2004 054 392 A1. In this case, an aqueous slip containing amorphous $SiO_2$ particles having a particle size distribution characterized by a $D_{50}$ value of about 5 μm and by a $D_{90}$ value of about 23 μm is produced by wet-milling silica glass grain. Further amorphous $SiO_2$ grains with an average grain size of about 5 μm are mixed with the base slip. The slip used as a bonding compound has a solid content of 90%, which consists of at least 99.9 wt. % $SiO_2$.

FIGS. 1 to 8 each schematically show a plan view of the end face of the cladding tube. The cladding tubes 1 each have longitudinal grooves 3 on the inner side of the cladding tube wall 2. The longitudinal grooves 3 are distributed evenly in hexagonal symmetry about the inner circumference of the cladding tube 1.

The cladding tubes 1 are made of silica glass. They have a length of 500 mm, an external diameter of 73 mm and an internal diameter of 24 mm.

Figure 1:
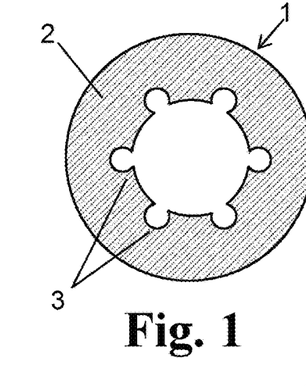
FIGS. 1 to 3 cladding tubes for use in a method for producing a preform for a hollow-core fiber having longitudinal structures for positioning anti-resonance element preforms in a plurality of embodiments, FIGS. 4 and 5 cladding tubes with longitudinal structures and anti-resonance element preforms positioned therein with the aid of contact points and contact surfaces, FIGS. 6 and 7 further embodiments of cladding tubes with longitudinal structures and anti-resonance element preforms positioned therein, FIGS. 8 and 9 an embodiment of a cladding tube with longitudinal structures and anti-resonance element preforms positioned therein, which are equipped with a capillary for the purpose of adjustable positioning, FIG. 10(*a*) schematically shows forming slots in a cladding tube, FIG. 10(*b*) schematically shows abutting anti-resonance element preforms to the longitudinal slots in the cladding tube of FIG. 10(*a*), FIG. 10(*c*) schematically shows placing an overlaying tube over the cladding tube of FIG. 10(*b*), FIG. 11(*a*) a detail of the longitudinal structure and anti-resonance element from FIG. 10*c* in an enlarged view in a starting position, FIG. 11(*b*) schematically shows the detail of FIG. 11(*a*) after pressure and heat deform the anti-resonance element outer tube wall, FIG. 12(*a*) a detail corresponding to FIG. 11(*a*) with another embodiment of the anti-resonance element, and FIG. 12(*b*) schematically shows the detail of FIG. 12(*a*) after pressure and heat form a further glass membrane within the anti-resonance element outer tube.

FIG. 1 shows deep, narrow, circular longitudinal grooves 3, which are almost closed in cross-section and are produced by drilling. The maximum depth is 3 mm and the internal diameter is 4 mm.

Figure 2:
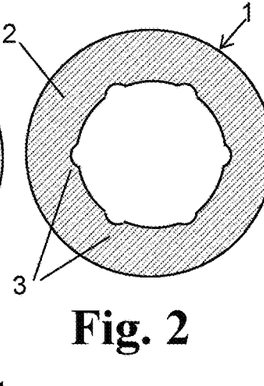

FIG. 2 shows shallow, narrow longitudinal grooves 3, which are semi-circular in cross-section and are produced by milling.

Figure 3:
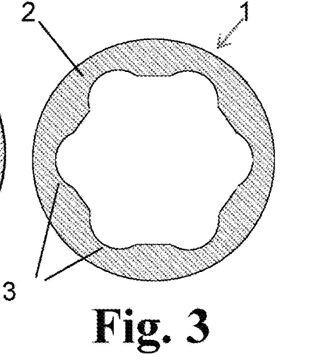

FIG. 3 shows shallow, narrow longitudinal grooves 3, which are dish-shaped in cross-section and are also produced by milling.

The longitudinal grooves 3 serve as positioning aids for anti-resonance element preforms 5. They can be present as an ensemble of nested elements that consists of an ARE outer tube 5a and an ARE inner tube 5b, as shown in FIGS. 4 and 5.

Figure 4:
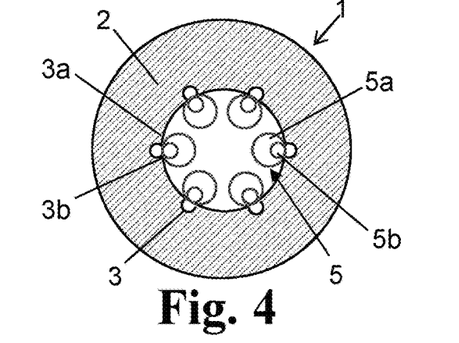

FIG. 4 shows deep, narrow circular longitudinal grooves 3, which are almost closed in cross-section and are produced by drilling and against which the anti-resonance element preforms 5 abut in each case at two edges 3a, 3b. The ARE outer tube has an external diameter of 73 mm in each case. The wall thickness of the ARE inner tube and of the ARE outer tube is about the same and is 0.35 mm.

Figure 5:
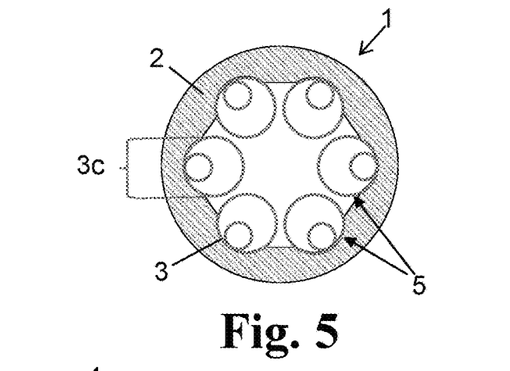

FIG. 5 shows shallow, wide longitudinal grooves 3, which are dish-shaped in cross-section and are produced by milling and against which the anti-resonance element preforms 5 abut in each case at larger contact surfaces 3c. The ARE outer tube has an external diameter of 73 mm in each case. The wall thickness of the ARE inner tube and of the ARE outer tube is about the same and is 0.35 mm.

Figure 6:
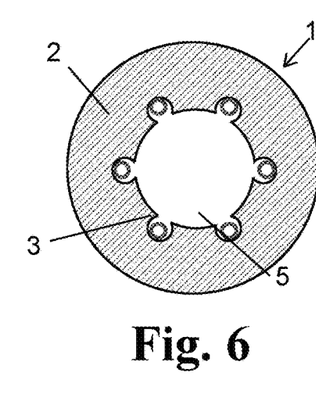

FIG. 6 shows deep, narrow, circular longitudinal grooves 3, which are almost closed in cross-section and are produced by drilling and in which the anti-resonance element preforms 5 are accommodated. In this case, the anti-resonance element preforms 5 are designed as simple capillary tubes.

Figure 7:
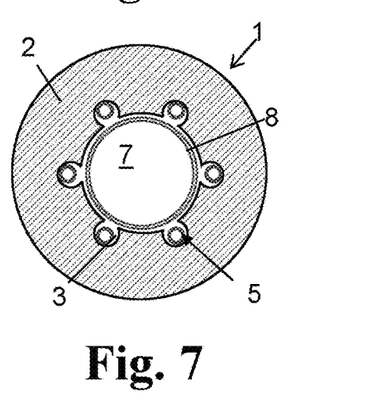

FIG. 7 shows deep, narrow, circular longitudinal grooves 3, which are almost closed in cross-section and are produced by drilling and in which the anti-resonance element preforms 5 are accommodated. In this case, the anti-resonance element preforms 5 are designed as simple capillary tubes. An insert tube 8 is inserted coaxially with respect to the longitudinal axis of the cladding tube into the inner bore 7 of the cladding tube.

The external diameter of the insert tube 8 is similar to the internal diameter of the cladding tube 1 (as FIG. 1) and its wall thickness is similar to that of the anti-resonance element preforms. Before the fiber drawing process, the cladding tube 1 is collapsed onto the insert tube 8 so that the longitudinal grooves 3 are closed. The closed longitudinal grooves form hollow channels which are subsequently inflated (for example, when elongating the preform). As a result, protuberances with convex surfaces, which act as an additional anti-resonant boundary layer and are directed inwardly in the direction of the inner bore 7, are formed on the insert tube 8. In a method variant (not shown in the figures), circular longitudinal grooves, which are almost closed in cross-section, are produced by drilling. An insert tube is inserted coaxially with respect to the longitudinal axis of the cladding tube into the inner bore of the cladding tube. The external diameter of the insert tube 8 is similar to the internal diameter of the cladding tube (as FIG. 1) and its wall thickness is similar to that of the anti-resonance element preforms. Before the fiber drawing process, the cladding tube is collapsed onto the insert tube so that the longitudinal grooves are closed. The closed longitudinal grooves form hollow channels which are subsequently inflated (for example, when elongating the preform). As a result, protuberances with convex surfaces, which act as anti-resonance elements and are directed inwardly in the direction of the inner bore, are formed on the insert tube.

Figure 8:
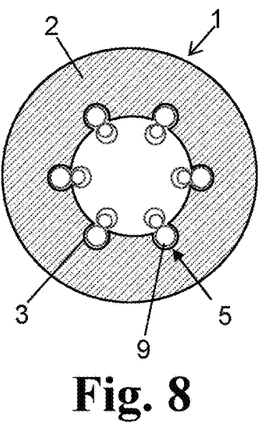
Figure 9:
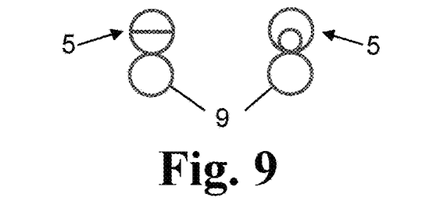

In the method variant shown in FIG. 8, the anti-resonance element preforms 5 are equipped with anti-resonance elements and additionally with a positioning capillary 9. The positioning capillaries 9 are each inserted into the circular longitudinal grooves 3, which are almost closed in cross-section and produced by drilling. The positioning capillaries 9 form hollow channels which can be inflated when the ensemble softens, for example when the preform is elongated, so that the anti-resonance elements fixed thereto can be pushed closer to the center (the core region). The amount of displacement can easily be adjusted and regulated by the internal pressure in the hollow channels (positioning capillaries 9). In addition to a precise adjustment of the azimuthal position, this also allows an adjustment of the radial position of the anti-resonance elements and thus the core diameter of the anti-resonant hollow core fibers. FIG. 9 shows two different embodiments of anti-resonance element preforms 5, each equipped with a positioning capillary 9.

Figure 10:
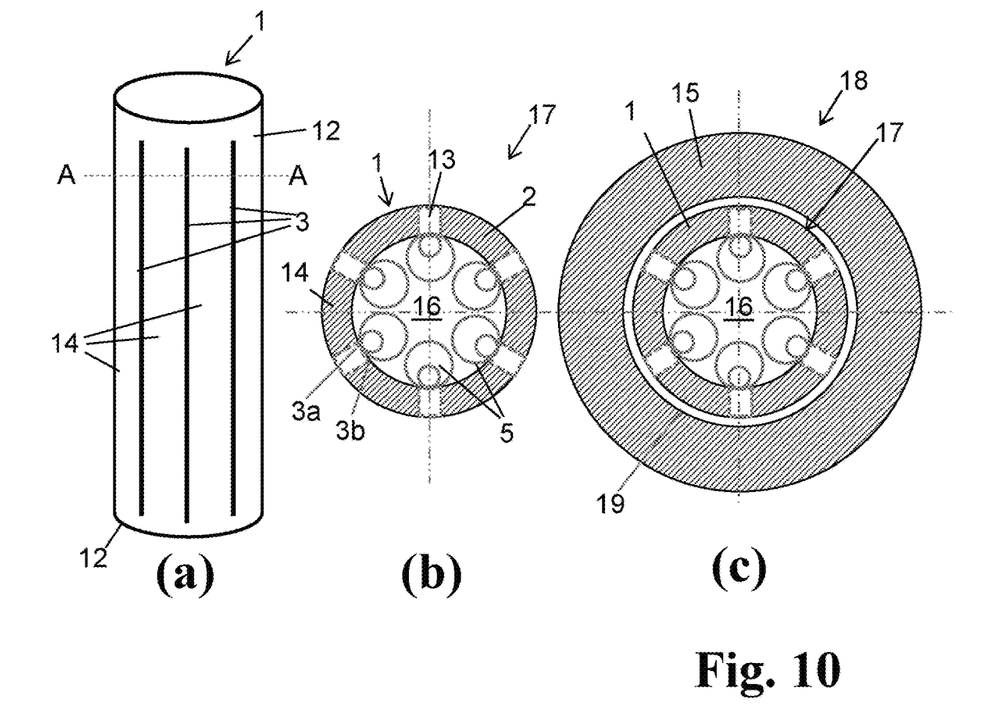

FIGS. 10 to 12 schematically show method steps for producing hollow-core fibers, wherein a silica glass cladding tube 1 with longitudinal slots 3 is used for precise positioning of the anti-resonance element preforms. As shown in FIG. 10(a), the wall of the cladding tube 1 is cut longitudinally at regular intervals at previously defined azimuthal positions, for example by means of a mechanical saw, water-jet cutting, laser or the like. The number of longitudinal incisions 3 corresponds to the number of anti-resonance element preforms 5 to be positioned; in the exemplary embodiment, there are six preforms 5. The longitudinal incisions 3 end before the cladding tube ends so that the end-face end regions 12 continue to remain closed circumferentially and join the remaining webs 14. The cut edges are subsequently vitrified. The cutting width of the longitudinal slots 3 is uniform and is 2 mm. The anti-resonance element preforms 5 have a substantially round outer cross-section with a diameter of 7.4 mm. It can be seen from the top view of the cross-section of the intermediate tube 10 along the section line A-A in FIG. 10(b) that the six longitudinal slots 3 are evenly distributed around the tube wall 2, and it shows the anti-resonance element preforms 5 which abut against the longitudinal slots 3 in each case at two contact lines—the cut edges 3a; 3b—and protrude into the inner bore 16 of the cladding tube. For fastening, the two ends of the anti-resonance element preforms 5 are, for example, glued to the inner side of the cladding tube 1 or fused thereto. Alternatively and preferably, the anti-resonance element preforms are connected to the inner sheath surface of the cladding tube by means of the above-described sealing and bonding compound containing $SiO_2$. Local fastening, in particular in the two end-face end regions, is sufficient for this purpose.

By means of a subsequent lengthening of this ensemble, the anti-resonance element preforms 5 are connected over their entire length to the cut edges 3a; 3b inside the cladding tube 1. By applying positive pressure in the inner bore of the cladding tube 1, a check can be made as to whether the kerfs 3 are completely closed by the anti-resonance element preforms 5. The longitudinal slots 3 thus serve as an exact positioning aid on which each anti-resonance element preform 5 can be precisely positioned and fixed.

FIG. 10(c) shows that the ensemble 17 consisting of cladding tube 1 and anti-resonance element preforms positioned therein is subsequently overlaid with an overlay tube 15 in order to add additional sheath material and to adjust the core-sheath diameter ratio prespecified for the hollow-core fiber in the secondary preform 18. In the secondary preform 18 thus obtained, an annular gap 19 remains between the buffer tube 15 and the ensemble 17.

During the elongation of the preform 18 to form the hollow-core fiber, gas can be introduced into or withdrawn from the hollow channels via the annular gap 19, which hollow channels have formed in the kerfs 3 between the overlay tube 15 and the fused anti-resonance element preforms 5 in order to produce positive pressure or negative pressure in the hollow channels.

Figure 11:
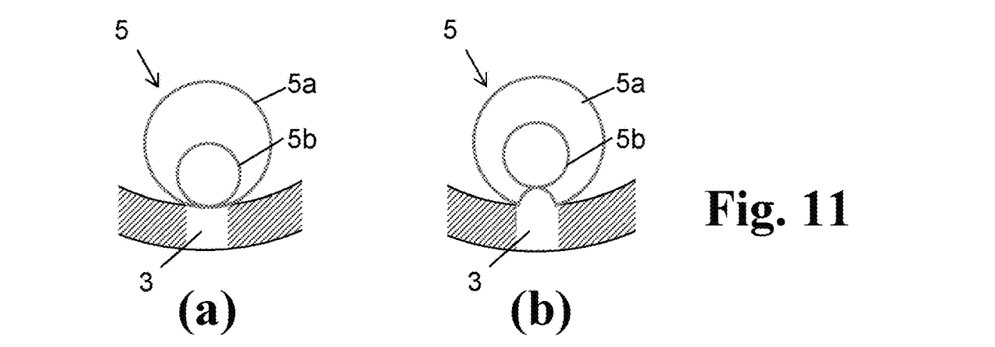

If required or desired, the radial position of the anti-resonance elements 5 in the inner bore 16 of the cladding tube can thus be modified and corrected, as outlined in FIG. 11. Sketch (a) shows an anti-resonance element preform 5 having an ARE outer tube 5a and nested inner element (ARE inner tube 5b) in the starting position. Sketch (b) shows the ARE outer tube wall, which is deformed by pressure and heat and which is inverted inwardly in regions, with the ARE inner tube 5b fastened to the inversion in a radial position that is modified compared to the starting position. Fiber designs which, in deviation from the classic "stack-and-draw technique," even have non-hexagonal symmetry and in particular non-integral symmetry can thus also be realized.

By applying pressure in the hollow channels, it is also possible to "fold over" a wall section of an anti-resonance element preform 5 toward the inside of the anti-resonance element preform.

Figure 12:
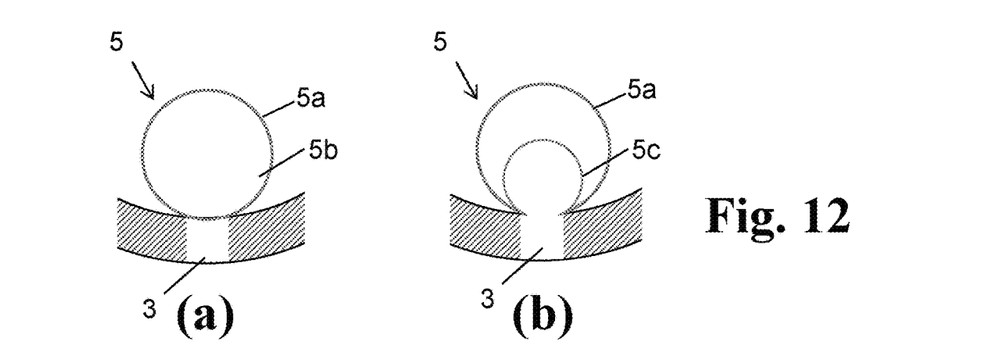

FIG. 12(a) shows an anti-resonance element preform 5 with a simple ARE outer tube 5a (without an additional nested ARE inner tube) in the starting position. Under the influence of heat and pressure, the wall section between the two contact lines is inflated inwardly. As shown in FIG. 12b, a further glass membrane 5c with a negatively (convexly) curved surface thus arises within the ARE outer tube 5a, which curved surface can replace a nested inner element, such as the ARE inner tube 5b (also referred to in the technical literature as a "nested element").

The invention claimed is:

1. A method for producing an anti-resonant hollow-core fiber comprising a hollow core extending along a longitudinal axis of the fiber and a sheath region surrounding the hollow core and comprising a plurality of anti-resonance elements, the method comprising:
   (a) providing a cladding tube comprising an inner bore of the cladding tube and a longitudinal axis of the cladding tube along which a cladding tube wall delimited by an inner side and an outer side extends,
   (b) providing a number of anti-resonance element preforms,
   (c) arranging the anti-resonance element preforms at desired positions of the inner side of the cladding tube wall to form a primary preform for the hollow-core fiber which comprises the hollow core region and the sheath region, and
   (d) elongating the primary preform to form the hollow-core fiber or further processing the primary preform into a secondary preform from which the hollow-core fiber is drawn, wherein the further processing comprises a single or repeated performance of one or more of the following hot-forming processes:
      (i) elongation,
      (ii) collapse,
      (iii) collapse and simultaneous elongation,
      (iv) collapse of additional sheath material,
      (v) collapse of additional sheath material and subsequent elongation,
      (vi) collapse of additional sheath material and simultaneous elongation,
   wherein the provision of the cladding tube according to method step (a) comprises a machining measure in which by machining in the region of the desired positions, the cladding tube wall is provided with a longitudinal structure extending in the direction of the longitudinal axis of the cladding tube, wherein the longitudinal structure has longitudinal slots distributed about the circumference of the cladding tube wall, and the anti-resonance element preforms are arranged on one longitudinal slot in each case.

2. The method according to claim 1, wherein the longitudinal structure of the cladding tube wall is produced by drilling, sawing, milling, cutting or grinding.

3. The method according to claim 1, wherein the cladding tube with a circular inner cross-section is provided.

4. The method according to claim 1, wherein the cladding tube comprises end-face ends, and that the longitudinal structure ends before the end-face ends.

5. The method according to claim 1, wherein the anti-resonance element preforms, when arranged at the desired position according to method step (c), touch the longitudinal slot at two edges in each case.

6. The method according to claim 1, wherein the longitudinal structure has a maximum width SB in the circumferential direction of the inner side of the cladding tube and that the anti-resonance element preforms have a diameter that is less than the maximum width SB of the longitudinal structure.

7. The method according to claim 1, wherein the longitudinal slots have parallel longitudinal edges and a maximum slot width SB, and the anti-resonance element preforms are connected to the longitudinal edges.

8. The method according to claim 7, wherein the anti-resonance element preforms are connected to the longitudinal edges by softening, accompanied by simultaneous lengthening.

9. The method according to claim 1, wherein the anti-resonance element preforms each have at least one anti-resonance element and at least one capillary connected to the anti-resonance element, wherein the capillary is accommodated in a recess of the longitudinal structure, and when a process according to method step (d) is carried out, the capillary is deformed by applying an internal pressure in the inner bore of the capillary.

10. The method according to claim 1, wherein the anti-resonance elements are arranged about the hollow core with an odd-numbered symmetry.

11. A method for producing a preform for an anti-resonant hollow-core fiber comprising a hollow core extending along a longitudinal axis of the fiber and a sheath region surrounding the hollow core, said sheath region comprising a plurality of anti-resonance elements, the method comprising:
   (a) providing a cladding tube comprising an inner bore of the cladding tube and a longitudinal axis of the cladding tube along which a cladding tube wall delimited by an inner side and an outer side extends,
   (b) providing a number of anti-resonance element preforms,
   (c) arranging the anti-resonance element preforms at desired positions of the inner side of the cladding tube wall to form a primary preform for the hollow-core fiber which comprises the hollow core region and the sheath region, and (d) optionally further processing the primary preform into a secondary preform for the hollow-core fiber, wherein the further processing comprises a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation,
wherein the provision of the cladding tube according to method step (a) comprises a machining measure in which, by machining in the region of the desired positions, the cladding tube wall is provided with a longitudinal structure extending in the direction of the longitudinal axis of the cladding tube, wherein the longitudinal structure has longitudinal slots distributed about the circumference of the cladding tube wall, and the anti-resonance element preforms are arranged on one longitudinal slot in each case.

* * * * *